United States Patent
Light et al.

(10) Patent No.: US 6,644,933 B2
(45) Date of Patent: Nov. 11, 2003

(54) WATER PUMP WITH ELECTRONICALLY CONTROLLED VISCOUS COUPLING DRIVE

(75) Inventors: Gerard M. Light, Marshall, MI (US); James E. Ignatovich, Ceresco, MI (US); Neil E. Robb, Jackson, MI (US)

(73) Assignee: BorgWarner, Inc., Auburn Hills, MI (US)

( * ) Notice: Subject to any disclaimer, the term of this patent is extended or adjusted under 35 U.S.C. 154(b) by 0 days.

(21) Appl. No.: 10/038,690

(22) Filed: Jan. 2, 2002

(65) Prior Publication Data

US 2003/0123995 A1 Jul. 3, 2003

(51) Int. Cl.[7] .................................................. F04B 49/00
(52) U.S. Cl. ........................ 417/223; 417/53; 123/41.44
(58) Field of Search .................................. 417/223, 362, 417/199.1, 201, 53; 192/58.6; 123/41.12, 41.44, 41.47, 509

(56) References Cited

U.S. PATENT DOCUMENTS

| | | | | |
|---|---|---|---|---|
| 3,019,875 A | * | 2/1962 | Folwer | 192/58 |
| RE30,428 E | * | 11/1980 | Detty | 192/58.6 |
| 4,278,159 A | * | 7/1981 | Roth et al. | 192/58 B |
| 5,152,383 A | * | 10/1992 | Boyer et al. | 192/58.6 |
| 6,007,303 A | * | 12/1999 | Schmidt | 417/223 |
| 6,481,390 B1 | * | 11/2002 | Robb | 123/41.44 |

* cited by examiner

*Primary Examiner*—Charles G. Freay
*Assistant Examiner*—Han L Liu
(74) *Attorney, Agent, or Firm*—Greg Dziegielewski; Artz & Artz, P.C.

(57) ABSTRACT

An electronically-controlled viscous coupling is coupled to a water pump to control the coolant flow rate of engine coolant to an engine at a given engine speed to maximize fuel economy and minimize emissions. The viscous coupling has a stationary electrical coil that, when excited by electrical current, induces the driven disk to flex away from an input disk within the viscous, thereby increasing the size of the shear area, thereby decreasing the amount of torque produced to drive the water pump shaft and impellers that control the coolant flow rate. A carrier coupled to the back of the driven disk maximizes the amount of flex allowed to the driven disk, thereby assuring a maximum decrease in rotational speed of the impellers at a given engine speed and ensuring that the driven disk does not contact the stationary coil.

18 Claims, 3 Drawing Sheets

WATER PUMP WITH ELECTRONICALLY CONTROLLED VISCOUS COUPLING DRIVE

TECHNICAL FIELD

The invention relates generally to water pumps and more specifically to water pumps having an electrically controlled viscous coupling drive.

BACKGROUND ART

Water pumps are typically used on vehicles today to provide heat transfer means for an engine during operation. The engine crankshaft typically drives water pumps at a fixed ratio. Thus, as the engine idle speed is reduced, as is the trend in vehicles today to reduce emissions, the water pump speed is correspondingly reduced. This reduction in water pump speed results in a reduction in the coolant flow through the cooling system which can result in poor heater output for the interior of the vehicle when needed in cold weather and also can result in poor coolant flow for engine cooling during hot weather.

Increasing the water pump speed by increasing the drive ratio from the crankshaft will increase the coolant flow at engine idle speeds, but it may result in overspeeding the pump at higher engine speeds which may produce pump cavitation and reduced water pump bearing life. Pump cavitation can result in pump damage and a reduction in cooling system performance.

The current state of the art is to add an auxiliary water pump, typically electrically driven, to provide additional coolant flow at low engine idle speeds. Another approach is to use moveable vanes in the inlet of the water pump to throttle the coolant flow at higher engine speeds.

It is thus an object of the present invention to provide good coolant flow at low engine idle speeds while avoiding pump cavitation at higher engine speeds without the need for an auxiliary water pump or moveable vanes. It is another object of the present invention to control the speed of the water pump for improving emissions and fuel economy.

SUMMARY OF THE INVENTION

The above and other objects of the invention are met by the present invention that is an improvement over known water pumps.

The present invention provides a clutch arrangement that uses two disks that are coaxial, normally in close proximity, and contain a viscous fluid, typically silicon fluid, on all sides and in the small space (shear gap) between them. The input disk is driven at water pump pulley speed. The driven disk is separately mounted on a shaft connected to the water pump impeller and is capable of being flexed at the center (hub area). By flexing the disk away from the input disk, the shear gap can be increased and the torque transmission decreased, thereby turning the impeller at a slower speed. An electromagnet provides the force to flex the driven disk. By controlling the amount of electric energy provided to the electromagnet, and hence the flex in the driven disk, the impeller speed can be precisely controlled.

The electronically controlled viscous coupling thus provides good coolant flow at low engine idle speeds while avoiding pump cavitation at higher engine speeds without the need for an auxiliary water pump or moveable vanes. This also improves fuel economy and emissions by maintaining the engine within an acceptable temperature range at regardless of engine speed.

Other features, benefits and advantages of the present invention will become apparent from the following description of the invention, when viewed in accordance with the attached drawings and appended claims.

BEST MODE(S) FOR CARRYING OUT THE INVENTION

Figure 1:
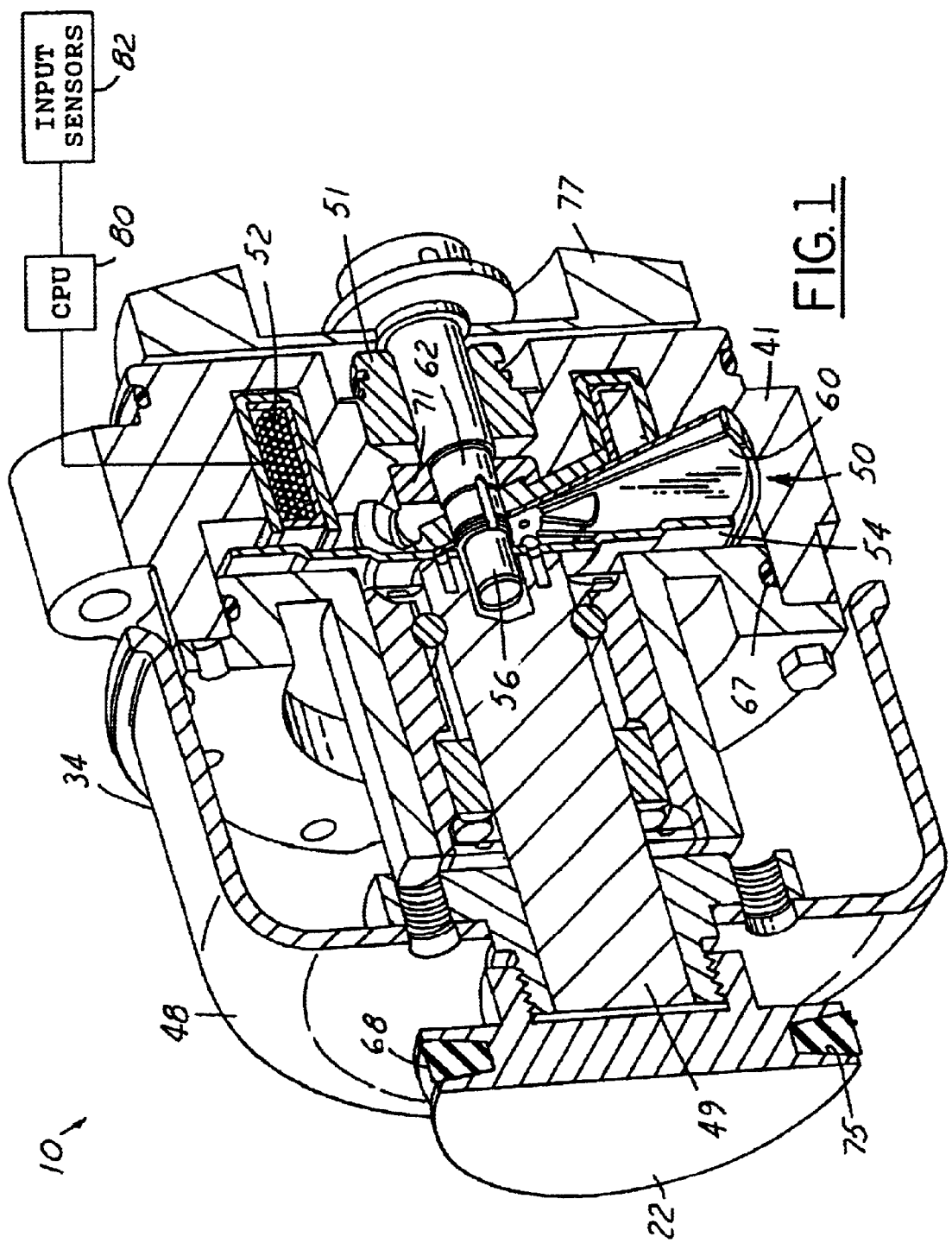
FIG. 1 is a perspective view of a viscous coupling coupled to a water pump according to a preferred embodiment of the present invention.
Figure 2:
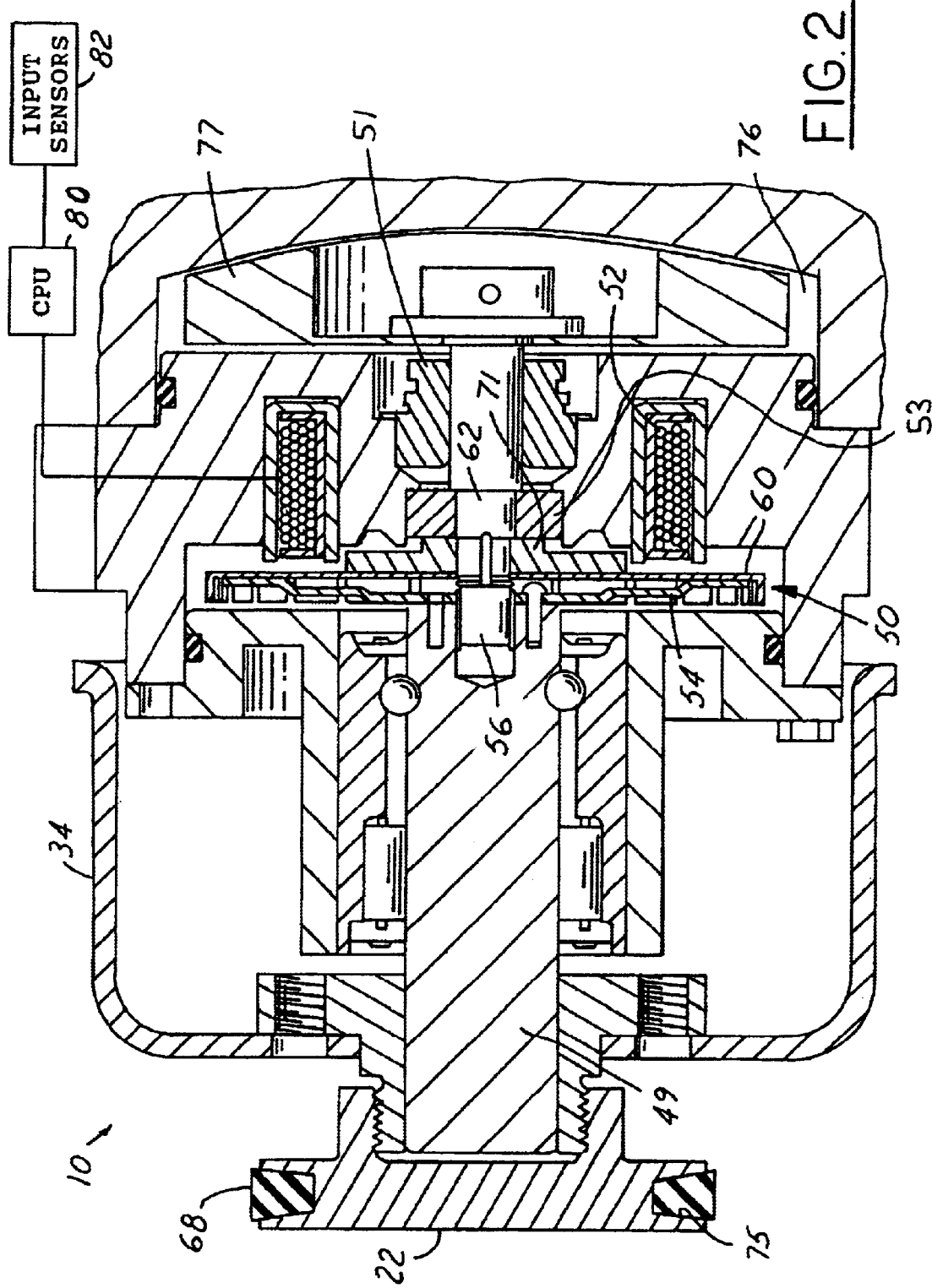
FIG. 2 is a sectional view of FIG. 1.

Referring now to FIGS. 1 and 2, an electronically controlled viscous coupling 50 contained within the rear housing 41 of a water pump 34 of a cooling system 10 is depicted. The rear housing 41 is affixed to the front housing 48 and sealed using o-rings 67. An input disk 54 is mounted to an input shaft 56. A driven disk 60 is mounted on an impeller shaft 62 that extends into the water pump 34 and is coupled with a plurality of impellers 77. The plurality of impellers 77 is contained within a coolant line 76 of the cooling system 10 between a radiator (not shown) and the engine (not shown). A face seal 51 prevents coolant from the coolant line 76 from entering the water pump through the opening at the impeller shaft 62. A bearing 53 and bushing, located within the input shaft 56, support the impeller shaft 62 within the rear housing 41. A working chamber (shown as 64 in FIGS. 2–4) is defined between the input disk 54 and the driven disk 60 within the rear housing 41. The input disk 54 is driven by an input shaft 56 sealed within a cartridge bearing assembly 49 contained within a front housing 48 of the water pump 34. A belt 68 is coupled to at a threaded region 75 of a water pump pulley 22. The water pump pulley 22 is coupled to the input shaft 56. The belt 68 is also is coupled to the crankshaft of the engine by a crankshaft pulley (not shown). Thus, as the engine transmits torque to the crankshaft, the belt 68 is rotated, which in turn rotates the water pump pulley 22, which in turn rotates the input shaft 56 and input disk 54.

Viscous fluid, typically a silicone-based fluid, is contained in the working chamber 64 defined between the input disk 54 and the driven disk 60. The viscous fluid produces shear because of the speed differential between the input disk 54 and the driven disk 60. The shear produces torque which is transmitted to the driven disk 60 and in turn to the impeller shaft 62 and to the impellers 77. The rotation of the impellers 77 causes coolant to flow to the engine through the coolant line 76 to cool the engine.

Figure 3:
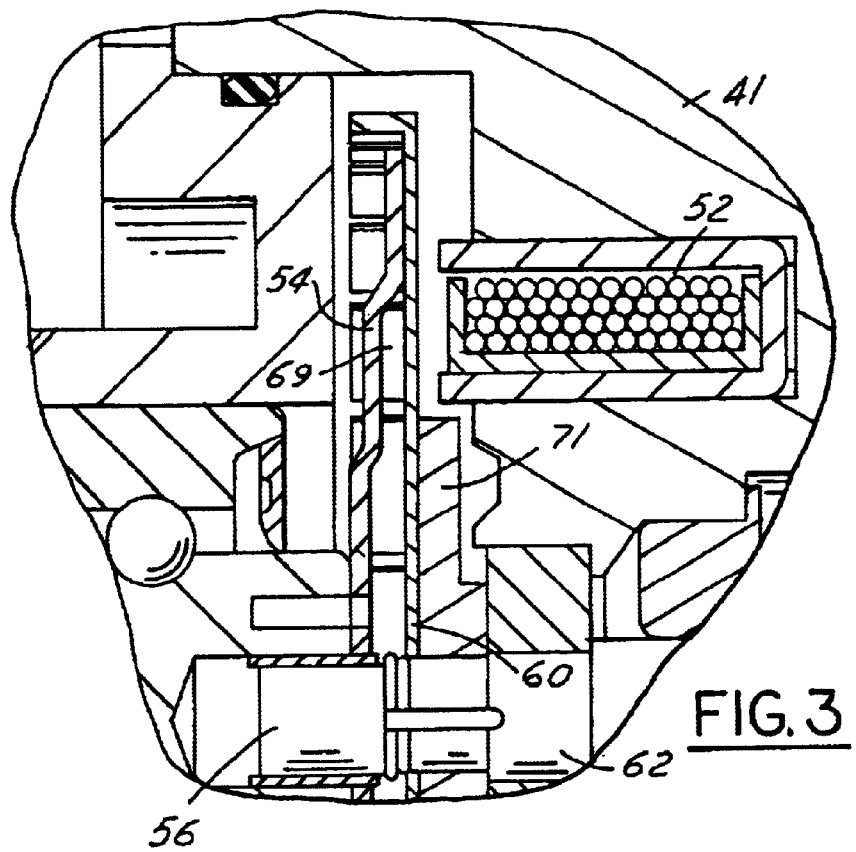
FIG. 3 is a clasp view of the viscous coupling of FIGS. 1 and 2 in an unexcited state.
Figure 4:
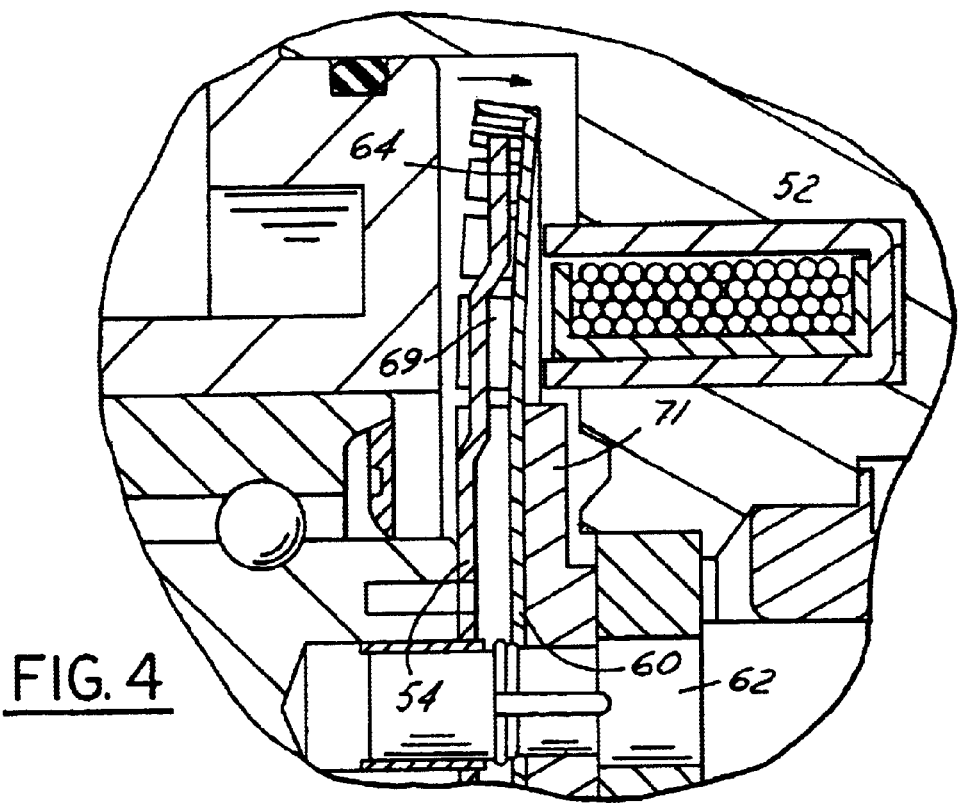
FIG. 4 is a clasp view of the viscous coupling of FIGS. 1 and 2 in an excited state.

A stationary coil 52 of the electronically controlled viscous coupling 50 is mounted to the rear housing 41 of a water pump 34. A carrier 71 is mounted to the center portion on one side of the driven disk 60. As shown in FIGS. 3 and 4, electrical excitation of the stationary coil 52 causes the driven disk 60, to flex towards the coil 52 and away from the input disk 54, thereby increasing the amount of space in the working area 64. This increased space decreases the amount of shear of viscous fluid created within the working area 64, thereby decreasing the rotational response of the driven disk 60 and in turn to the impeller shaft 62 and to the impellers 77. Thus, the of coolant flow through the coolant line 76 to the engine is a function of the amount of electrical excitation imparted on the stationary coil 52. To decrease the coolant flow at a given engine speed, simply increase the amount of electrical excitation to the stationary coil 52. The carrier 71 prevents the driven disk 60 from contacting the stationary coil 52 at higher magnetic fluxes.

The excitation of the stationary coil 52 may be controlled in a wide variety of preferred ways. For example, in one preferred embodiment of the present invention, an electronic control unit 80 may be electronically coupled between the stationary coil 52 and a number of vehicle sensors 82 to control electrical excitation as a function of many different automotive input signals obtained from the vehicle sensors. A non-exhaustive list of potential input signals 82 includes cylinder head temperature signals, fuel injection timing signals, and heater demand signals. In alternative embodiments, the electronic control unit 80 may also be coupled to a cooling fan and coolant valve in addition to stationary coil 52 and vehicle sensors 82 to further optimize fuel economy and emissions. Moreover, in other alternative embodiments, the control of electrical excitation of the stationary coil 52 may be controlled via a thermal switch coupled within an engine or cooling system component.

In the configuration shown in FIGS. 1–2, the viscous coupling 50 is failsafe. If the electrical power is turned off or fails in some manner, the viscous coupling 50 will continue to work to provide coolant flow to the engine as a function of engine speed, but with impeller 77 speed limited by the shear torque capability of the viscous coupling 50.

The present invention offers many advantages over currently available cooling systems 11. First, the water pump speed is controlled electronically to provide adequate coolant flow under various circumstances. When the engine 12 is first turned on, at a point where the engine temperature is measured by temperature sensors to be cool, the stationary coil 52 is maintained in an excited state to increase the shear space within the working area 64, thus reducing torque transmission and minimizing impeller 77 speed. This allows the engine 12 to warm up as quickly as possible to its preferred engine temperature range, wherein fuel economy and emissions are idealized. As the engine 12 warms up to acceptable levels, as sensed by various engine temperature sensors 82, the amount of rotation of the impeller shaft 62, and correspondingly the amount of coolant flow through the cooling system 11, can be increased by deenergizing the stationary coil 52 to return the driven disk 60 to its normal position, thereby decreasing the size of the working area 64, which increases the amount of shear and torque available to rotate the impeller shaft 62 and impellers 77, thereby increasing the amount of coolant flow through the cooling system 11. Thus, the amount of torque necessary to maintain the cooling system 11 to provide idealized fuel economy and emissions at various engine speeds and temperatures can be quickly and continually adjusted by simply varying the electrical excitation of a stationary coil 52 in the coupling 50.

Second, because the coupling 50 is maintained absent electrical excitation of the stationary coil 52, the viscous coupling 50 is failsafe. If electrical power is either directed off by the cooling system 11, or if electrical power fails, the coupling 50 is maintained, thereby insuring adequate coolant flow. As described previously, the viscous coupling also provides the added advantage of "speed limiting" which prevents pump cavitation.

While the best modes for carrying out the present invention have been described in detail herein, those familiar with the art to which this invention relates will recognize various alternate designs and embodiments for practicing the invention as defined by the following claims. For example, the location of the input disk 54 relative to the driven disk 60 and water pump 34 could be changed, in that the input disk 54 could be between the driven disk 60 and the water pump 34 and work in a similar manner. All of these embodiments and variations that come within the scope and meaning of the present claims are included within the scope of the present invention.

What is claimed is:

1. An electronically-controlled viscous coupling coupled to a water pump in an engine for controlling the coolant flow rate through the water pump at a given engine speed, the electronically-controlled viscous coupling comprising:
    an input disk;
    a driven disk fluidically coupled with said input disk, said driven disk and said input disk defining a working chamber therebetween; and
    a stationary coil closely coupled to said driven disk, said stationary coil capable of being electrically stimulated to produce a magnetic field that flexes said driven disk away from said input disk.

2. The viscous coupling of claim 1, wherein said stationary coil is coupled within a rear housing of the water pump.

3. The viscous coupling of claim 1 further comprising an electronic control unit coupled to said stationary coil, said electronic control unit capable of electrically stimulating said stationary coil to produce a magnetic field.

4. The viscous coupling of claim 3 further comprising a plurality of input sensors coupled to said electronic control unit, said plurality of input sensors capable of providing signals to said electronic control unit through which said electronic control unit can control the amount of electrical stimulation sent to said stationary coil at said given engine speed.

5. The viscous coupling of claim 4, wherein said plurality of input sensors is selected from the group consisting of cylinder head temperature sensors, fuel injection timing sensors, and heater demand sensors.

6. The viscous coupling of claim 1 further comprising a carrier coupled to a center portion of said driven disk, said carrier being located on the opposite side of said driven disk from said input disk, said carrier functioning to maximize the amount of flexing of said driven disk and the corresponding size of said working chamber, thereby controlling the minimum rotational rate of said driven disk at said given engine speed.

7. A method for controlling the flow rate of engine coolant through a cooling system to improve fuel economy and reduce emissions at a given engine speed, the method comprising:
    providing an electronically controlled viscous coupling within a water pump in the cooling system, said electronically controlled viscous coupling comprising an input disk, a driven disk fluidically coupled with said input disk, said driven disk and said input disk defining a working chamber therebetween, and a stationary coil closely coupled to said driven disk;
    electronically controlling the size of a working chamber, wherein the size of said working chamber controls the shear rate of a viscous fluid contained between said input disk and said driven disk, wherein said shear rate controls the rotational rate of said driven disk, wherein said driven disk controls the rotational rate of a water pump shaft coupled to said driven disk, wherein said water pump shaft controls the rotational rate of a plurality of impellers coupled to said water pump shaft and contained within a cooling line to control the flow rate of engine coolant through said cooling line in the cooling system.

8. The method of claim 7, wherein of electronically controlling the size of a working chamber comprises:
    introducing a magnetic field within said electronically controlled viscous coupling, wherein said driven disk flexes away from said input disk in response to said magnetic field and thus increases the size of said working chamber, thereby decreasing the shear rate within said working chamber that in turn decreases the rotational speed of said driven disk and said plurality of impellers at a given engine speed.

9. The method of claim 8, wherein introducing a magnetic field comprises:

coupling a stationary coil within said rear body of said water pump at a position near a carrier;

introducing an electrical current to said stationary coil, wherein said electrical charge induces a magnetic field around said stationary coil in response to said electrical current, wherein the amount of said electrical current introduced to said stationary coil is proportional to the amount of said magnetic field induced.

10. The method of claim 9, where introducing an electrical current to said stationary coil comprises:

coupling a plurality of input sensors to an electronic control unit, said plurality of input sensors capable of sending electronic signals to said electronic control unit; and coupling an electronic control unit to said stationary coil, wherein said electronic control unit processes said input signals and introduces an electrical current to said stationary coil as a function of said input signals and the given engine speed to control the size of said working chamber and thus control the flow rate of engine coolant through the cooling system.

11. The method according to claim 10, wherein coupling a plurality of input sensors comprises coupling a plurality of input sensors to an electronic control unit, said plurality of input sensors capable of sending electronic signals to said electronic control unit, wherein said plurality of input sensors is selected from the group consisting of cylinder head temperature sensors, fuel injection timing sensors, and heater demand sensors.

12. The method of claim 8, wherein the maximum size of said working chamber is controlled by a carrier coupled to said driven disk, said carrier limiting the amount of flexing of said driven disk in response to said magnetic flux, thereby providing a minimum rotational rate of said driven disk at a given engine speed.

13. A water pump for use in a coolant system to cool an engine comprising:

a front housing;

a water pump pulley coupled to said front housing, said water pump pulley having a threaded region;

a drive belt coupled to said threaded region, said drive belt rotating at a rate proportional to a given engine speed;

a water pump bearing assembly substantially coupled within said front housing;

an input shaft rotatably coupled within said water pump bearing assembly and coupled to said water pump pulley;

an input disk coupled to said input shaft;

a driven disk fluidically coupled with said input disk, said driven disk and said input disk defining a working chamber therebetween;

a water pump drive shaft coupled with said driven disk and substantially contained within a bearing assembly located within said rear housing;

a plurality of impellers coupled to said water pump shaft and located within a coolant line of the cooling system, said plurality of impellers capable of directing an amount of coolant to the engine when rotated; and a stationary coil closely coupled to said driven disk, said stationary coil caplable of being electically stimulated to produce a magnetic field that flexes said driven disk away from said input disk.

14. The water pump of claim 13, wherein said stationary coil is coupled within a rear housing of the water pump.

15. The water pump of claim 13 further comprising an electronic control unit coupled to said stationary coil, said electronic control unit capable of electrically stimulating said stationary coil to produce a magnetic field.

16. The water pump of claim 15 further comprising a plurality of input sensors coupled to said electronic control unit, said plurality of input sensors capable of providing signals to said electronic control unit through which said electronic control unit can control the amount of electrical stimulation sent to said stationary coil at said given engine speed.

17. The water pump of claim 16, wherein said plurality of input sensors is selected from the group consisting of cylinder head temperature sensors, fuel injection timing sensors, and heater demand sensors.

18. The water pump of claim 13 further comprising a carrier coupled to a center portion of said driven disk, said carrier being located on the opposite side of said driven disk from said input disk, said carrier functioning to maximize the amount of flexing of said driven disk and the corresponding size of said working chamber, thereby controlling the minimum rotational rate of said driven disk at said given engine speed.

* * * * *